United States Patent [19]

Walsh

[11] 4,410,423

[45] Oct. 18, 1983

[54] SEPARATION OF SPENT CATHODE CARBON AND ALKALINE ORE

[75] Inventor: William E. Walsh, Florence, Ala.

[73] Assignee: Reynolds Metals Company, Richmond, Va.

[21] Appl. No.: 360,829

[22] Filed: Mar. 23, 1982

[51] Int. Cl.³ ............................................... B03B 1/00
[52] U.S. Cl. ....................................... 209/4; 209/233; 264/37; 423/461; 423/448
[58] Field of Search ........................... 209/1, 2, 4, 233; 423/461, 448, 445; 264/37, 105; 425/217

[56] References Cited

U.S. PATENT DOCUMENTS

| | | | |
|---|---|---|---|
| 780,297 | 1/1905 | Krom et al. | 209/4 |
| 3,940,237 | 2/1976 | Gonzalez et al. | 55/99 |

FOREIGN PATENT DOCUMENTS

| | | | |
|---|---|---|---|
| 53-68468 | 6/1978 | Japan | 209/1 |
| 55-62104 | 5/1980 | Japan | 423/448 |
| 621380 | 7/1978 | U.S.S.R. | 209/1 |

*Primary Examiner*—Bernard Nozick
*Attorney, Agent, or Firm*—Alan T. McDonald

[57] ABSTRACT

A method for separating the alkaline ore and spent carbon fractions contained in spent electrolytic cell cathode comprising the steps of:
(a) grinding the spent cathode to a suitable particle size;
(b) treating the product of step (a) with ultrasonic energy, sulfuric acid, or both, for a period sufficient to achieve a measurable particle size distinction between the alkaline ore and carbon particles; and
(c) screening the alkaline ore and carbon particles to achieve separation of the alkaline ore particles which pass through the screen from the carbon particles which are retained on the screen.

6 Claims, No Drawings

SEPARATION OF SPENT CATHODE CARBON AND ALKALINE ORE

FIELD OF THE INVENTION

The present invention relates to a method for separating spent cathode carbon from alkaline ore both present in a mixture when spent cathodes are removed from alumina reduction cells.

BACKGROUND OF THE INVENTION

Conventional electrolytic cells for the extraction of aluminum from alumina comprise a carbon anode immersed in a bath of molten alumina, cryolite and sodium fluoride which is contained in a pot shell lined with a carbon cathode. In use, the cathode portion of the pot becomes spent, i.e. its conductivity sufficiently reduced or its physical integrity compromised so that the pot must be emptied, the carbon cathode lining removed and a new cathode rammed into place in the pot shell.

The spent cathode which is removed in this operation contains carbon and alumina which have until now generally been discarded because there was no good way to separate these two useful components for recycling into the reduction process.

It thus has been the aim for a number of years to develop a commercial process which would permit recovery of the carbon and alumina for recycling in the reduction process.

U.S. Pat. No. 780,297 to Krom et al describes a process for obtaining carbon from Wallastonite ores which contain significant amounts of silica wherein the ore is treated with sulfuric acid enabling silica to occur as relatively fine particles as compared with the graphite particles present in the ore. The two fractions thus produced are then separated by screening. There is no suggestion in this patent that a similar technique would be useful for the recovery of carbon and alumina from spent electrolytic cell linings.

SUMMARY OF THE INVENTION

According to the present invention, there is provided a method for separating enriched alumina ($Al_2O_3$), known as alkaline ore, from spent cathode carbon contained as a mixture in the insulation layer removed from electrolytic reduction cells (the spent cathode).

The process of the present invention comprises the steps of:

(a) grinding spent cathode material which comprises alkaline ore and carbon particles to a suitable particle size which will permit separation after treatment in accordance with step (b);

(b) treating the product of step (a) with sulfuric acid, ultrasonic energy or both for a period sufficient and in a manner to reduce the particle size of the alkaline ore portion sufficiently as to permit separation thereof from the carbon portion which is not substantially reduced in particle size by this treatment; and (c) separating, by screening or otherwise, the solid residue of step (b) into two portions comprising the carbon particles and the alkaline ore particles.

DETAILED DESCRIPTION

The spent cathode material comprising carbon and alkaline ore is removed from the cathode shell in the conventional manner and ground to a relatively uniform particle size which will permit their ultimate separation after treatment with sulfuric acid or ultrasonic energy. Such grinding may be achieved using conventional grinding techniques such as jaw crushing and hammer milling. The mixture is then treated in a manner that will reduce the size of the alkaline ore particles faster than the carbon particles. Two techniques have been found suitable for achieving this particle size reduction. The first involves dispersing the ground spent cathode in water and applying ultrasonic energy of a frequency of from about 10 KHz to about 90 KHz for a period sufficient to accomplish alkaline ore particle size reductions on the order of 20-40% while no significant reduction in the carbon particle size is obtained. Treatment periods on the order of from about 15 to about 60 minutes are normally sufficient to obtain such particle size degradation.

The second technique which has been found useful involves treatment of the ground mixture with hot (lightly boiling) sulfuric acid. Treatment times on the order of from about 10 to about 40 minutes have been found useful using this technique. Since the alkaline ore portion of the mixture is composed of fine grains of $Al_2O_3$ bound together by sodium fluoride and cryolite the acid dissolves the fluoride and cryolite freeing the $Al_2O_3$ and reducing the particle size of the alkaline ore. Since the carbon is substantially unaffected by the acid the carbon particles remain at about their originally ground size.

After the ultrasonic or acid treatment, the residual solids are screened or otherwise treated to separate the smaller alkaline ore fraction from the larger carbon fraction.

The following examples will serve to better illustrate the successful practice of the present invention.

EXAMPLE I

Spent cathode material recently removed from an electrolytic reduction cell was ground to a particle size of about 12 mm. The ground mixture of alkaline ore and spent carbon was then mixed with water and ultrasonically treated for a period of 20 minutes. The alkaline ore portion of the sample showed a loss of 20% while the carbon showed a loss of only 2%. The two fractions were readily separable by screening.

EXAMPLE II

Spent cathode material ground or described in Example I was placed in lightly boiling 6 N sulfuric acid for a period of about 20 minutes. The alkaline ore fraction demonstrated a loss of 18% and the carbon fraction a loss of only 3%. Again, the two fractions could be easily separated by screening.

While the present invention has been particularly described with regard to illustrative and presently preferred embodiments thereof, modifications of the embodiments described herein may be variously carried out. Thus it is intended that the appended claims be construed to include alternative embodiments of the inventive concepts disclosed herein, except insofar as limited by the prior art.

I claim:

1. A method for separating $Al_2O_3$ alkaline ore and carbon fractions contained in a spent electrolytic cell cathode comprising the steps of:
   (a) grinding the spent cathode to a suitable particle size;
   (b) treating the product of step (a) with ultrasonic energy in a manner and for a time sufficient to reduce the $Al_2O_3$ alkaline ore particle size without substantially reducing the carbon particle size to achieve a measurable and useful particle size distinction between the $Al_2O_3$ alkaline ore and carbon fractions which will permit separation; and (c) separating the $Al_2O_3$ alkaline ore and carbon fractions by particle size.

2. A method for separating $Al_2O_3$ alkaline ore and carbon fractions contained in a spent electrolytic cell cathode comprising the steps of:

(a) grinding the spent cathode to a suitable particle size;

(b) treating the product of step (a) with a combination of ultrasonic energy and sulfuric acid in a manner and for a time sufficient to reduce the $Al_2O_3$ alkaline ore particle size without substantially reducing the carbon particle size to achieve a measurable and useful particle size distinction between the $Al_2O_3$ alkaline ore and carbon fractions which will permit separation; and (c) separating the $Al_2O_3$ alkaline ore and carbon fractions by particle size.

3. The method of claim 1 or 2 wherein the ultrasonic energy comprises energy waves from about 10 KHz to 90 KHz.

4. A method for separating $Al_2O_3$ alkaline ore and carbon fractions contained in a spent electrolytic cell cathode comprising the steps of:

(a) grinding the spent cathode to a suitable particle size;

(b) treating the product of step (a) with sulfuric acid in a manner and for a time sufficient to reduce the $Al_2O_3$ alkaline ore particle size without substantially reducing the carbon particle size to achieve a measurable and useful particle size distinction between the $Al_2O_3$ alkaline ore and carbon fractions which will permit separation; and (c) separating the $Al_2O_3$ alkaline ore and carbon fractions by particle size.

5. The method of claim 1, 4 or 2 wherein the separation is achieved by screening.

6. The method of claim 4 or 2 wherein the treatment with sulfuric acid comprises mixing the ground particles with lightly boiling 6 N sulfuric acid.

* * * * *